United States Patent
Chapman et al.

(10) Patent No.: US 10,326,277 B2
(45) Date of Patent: Jun. 18, 2019

(54) HIERARCHICAL CONTROL OF A PLURALITY OF POWER SUBSYSTEMS AND METHOD OF OPERATING THE SAME

(71) Applicant: Enphase Energy, Inc., Petaluma, CA (US)

(72) Inventors: Patrick Chapman, Austin, TX (US); Jonathan Ehlmann, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 363 days.

(21) Appl. No.: 14/751,502

(22) Filed: Jun. 26, 2015

(65) Prior Publication Data
US 2016/0380434 A1  Dec. 29, 2016

(51) Int. Cl.
*H02J 3/38* (2006.01)
*G05F 1/67* (2006.01)

(52) U.S. Cl.
CPC .............. *H02J 3/383* (2013.01); *H02J 3/385* (2013.01); *G05F 1/67* (2013.01); *Y02E 10/58* (2013.01)

(58) Field of Classification Search
CPC .. G05F 1/67; H02J 3/383; H02J 3/385; Y02E 10/58
USPC ..................................................... 307/52, 84
See application file for complete search history.

(56) References Cited

U.S. PATENT DOCUMENTS

| | | | | |
|---|---|---|---|---|
| 5,659,465 A * | 8/1997 | Flack | .................... | H02J 7/0013 320/102 |
| 7,962,249 B1 * | 6/2011 | Zhang | ..................... | H02J 3/383 307/82 |
| 8,158,877 B2 * | 4/2012 | Klein | ................ | H01L 31/02021 136/244 |
| 2011/0035070 A1 * | 2/2011 | Kanai | ....................... | H02J 3/14 700/288 |
| 2011/0160930 A1 * | 6/2011 | Batten | ...................... | G05F 1/67 700/298 |

(Continued)

FOREIGN PATENT DOCUMENTS

WO    2016209433 A1    12/2016

OTHER PUBLICATIONS

Qin, Shibin, et al., Sub-Module Differential Power Processing for Photovoltaic Applications, University of Illinois at Urbana-Champaign, Urbana, Illinois, Mar. 17, 2013, 8 Pgs.

(Continued)

*Primary Examiner* — Levi Gannon
(74) *Attorney, Agent, or Firm* — Moser Taboada (57) ABSTRACT

An apparatus formed with a plurality of power subsystems, and method of operating the same. In one embodiment, the apparatus is formed with plurality of local controllers to control an operating characteristic of at least one of the plurality of power subsystems. A central controller of the apparatus is configured to receive an indication of an overall power produced by the plurality of power subsystems, selectively command a first local controller of the plurality of local controllers to change a value of the operating characteristic of a first power subsystem of the plurality of power subsystems, receive an indication of a change in the overall power in response to the change in the value of the operating characteristic of the first power subsystem, and store, in memory, the change in the value of the operating characteristic of the first power subsystem if the overall power is increased.

20 Claims, 6 Drawing Sheets

(56) References Cited

U.S. PATENT DOCUMENTS

| | | | | |
|---|---|---|---|---|
| 2011/0232714 A1* | 9/2011 | Bhavaraju | ............... | H02J 3/385 |
| | | | | 136/244 |
| 2012/0042588 A1* | 2/2012 | Erickson, Jr. | ..... | H01L 31/02021 |
| | | | | 52/173.3 |
| 2012/0091800 A1* | 4/2012 | Shenoy | ............. | H01L 31/02021 |
| | | | | 307/24 |
| 2012/0091817 A1* | 4/2012 | Seymour | ................ | H02J 3/383 |
| | | | | 307/82 |
| 2012/0262960 A1* | 10/2012 | Giraut Ruso | ............ | H02J 3/16 |
| | | | | 363/71 |
| 2015/0372490 A1* | 12/2015 | Bakas | .................... | H02J 3/385 |
| | | | | 307/52 |
| 2016/0079761 A1* | 3/2016 | Pilawa-Podgurski | ..... | G05F 1/67 |
| | | | | 307/77 |

OTHER PUBLICATIONS

Shimizu*Toshihisa, et al., "Generation Control Circuit for Photovoltaic Modules", IEEE Transactions on Power Electronics, vol. 16, No. 3, May 1, 2001, pp. 293-300.

Qin, Shibin, et al., "Sub-Module Differential Power Processing for Photovoltaic Applications", University of Illinois at Urbana-Champaign, https://www.ideals.illinois.edu/bitstream/handle/2142/49501/Shibin_Qin.pdf?sequence=1&isAllowed+y, 42 pages, May 30, 2014.

PCT/US2016/033078 International Search Report and Written Opinion dated Sep. 27, 2016, 5 pages.

* cited by examiner

HIERARCHICAL CONTROL OF A PLURALITY OF POWER SUBSYSTEMS AND METHOD OF OPERATING THE SAME

BACKGROUND

Photovoltaic ("PV") panels or modules are generally fabricated with multiple substrings of PV cells connected in series to convert solar insolation to electric power. The PV modules have traditionally been manufactured as independent components that employ a power converter (also referred to as a "power subsystem") in each PV module to independently control a module operating characteristic, particularly for providing maximum power point tracking ("MPPT"). A direct current ("dc") power generated by each PV module is generally converted to alternating current ("ac") power in a central power converter for connection to a local utility grid.

The overall electrical performance of a PV module such as the efficiency to convert solar insolation to electrical power is a performance metric that depends on multiple factors. One factor is MPPT that ensures that each PV module operates at a voltage and current to maximize electrical energy at a particular level of solar insolation. Ensuring MPPT across the power converters for multiple PV modules or across the power converters for multiple substrings of PV cells within a PV module can be a challenging design task. To perform MPPT, a control loop is generally employed to measure locally produced current and voltage to properly adjust, for example, a duty cycle of a power train of the power converter for MPPT. In addition to local control, however, it would be advantageous to implement hierarchal control for a plurality of PV modules, multiple substrings of PV cells of a PV module, and/or each PV cell for the multiple substrings of PV cells to augment the performance of a power system such as a PV system.

BRIEF DESCRIPTION OF THE DRAWINGS

For a more complete understanding of the present disclosure, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" state of operation of a PV module does not necessarily imply that this state is the first state in a sequence; instead the term "first" is used to differentiate this state from another state (e.g., a "second" state).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled." The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit." As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Embodiments will be described in a specific context, namely, an apparatus operable with a plurality of power subsystems (e.g., power converters) to improve an overall power conversion efficiency or power produced therein, and methods of operating the same. While the principles of the present disclosure will be described in the environment of an apparatus formed with a plurality of power subsystems such as, without limitation, photovoltaic ("PV") modules, any application that benefits from control of a plurality of power subsystems with improved power conversion efficiency or increased power production is well within the broad scope of the present disclosure.

A differential power processing ("DPP") converter, a typical module-level power electronics ("MLPE") converter (often referred to as a "power converter" or "power subsystem"), such as a dc-dc power optimizer, performs maximum power point tracking ("MPPT") for PV modules and/or multiple substrings of PV cells of a PV module. A dc-dc power optimizer processes 100 percent ("%") of the power coming from its associated PV module or substring of PV cells. This corrects for mismatches in MPP current that would otherwise occur in series-connected modules and/or substrings of PV cells, which otherwise would inherently conduct the same current.

The DPP converters, on the other hand, only process the mismatch in power rather than the total power of a PV module (or PV module substring, or any substring of PV cells that would otherwise be connected in series). The DPP converter can provide overall improvements in operating characteristics of a PV module and/or substring of PV cells since the maximum power point mismatches are generally small. As a result, a relatively small correction for the power is all that is required. The DPP converters allow the bulk of current from a PV module and/or substring of PV cells to pass directly to neighboring PV modules and/or substrings of PV cells simply via wires, which can be very efficient. Thus, only the mismatch currents flow through the DPP converters.

For example, if two PV modules that would normally be connected in series have maximum power point currents of five and six amperes ("A"), respectively, then the mismatch current is one ampere. If the two PV modules were connected in series, they would be forced to carry the same current, which would not be optimal for either PV module. The DPP converters provide a path for the one ampere mismatch current. Since the current mismatches are usually small, a DPP converter may have the advantage of low-current/low-power operation. This is an improvement over typical dc-dc power optimizers that carry full current and full power. As such, the DPP converters can have low cost and less efficient. The two main types of DPP architecture are a "PV-to-PV" architecture and a "PV-to-bus" architecture. While the discussion that follows will be directed to substrings of PV cells, it should be understood that the principles as set forth herein are applicable to PV modules or PV cells as well.

Figure 1:
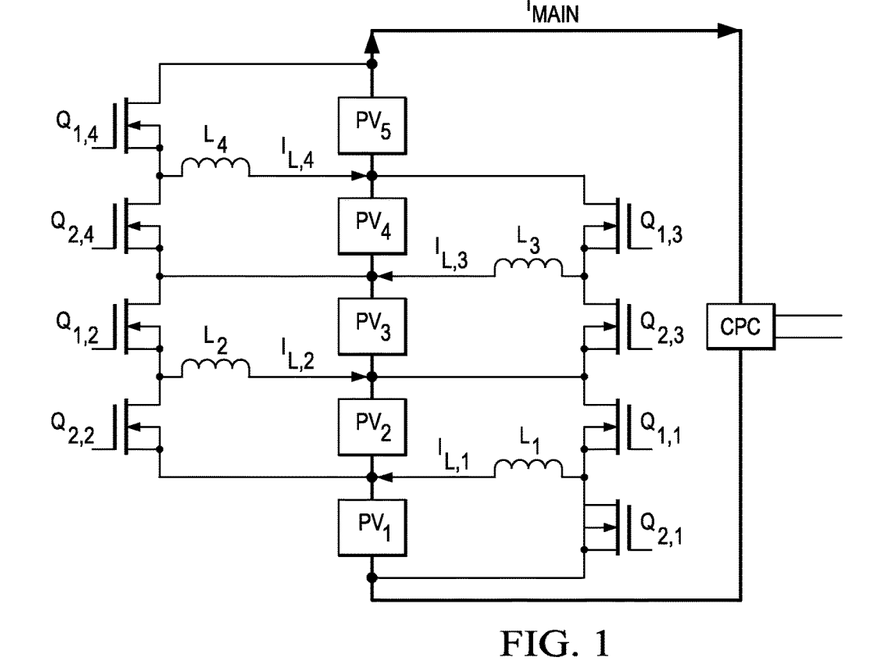
FIG. 1 illustrates a partial schematic diagram of an embodiment of a PV-to-PV architecture.

Turning now to FIG. 1, illustrated is a partial schematic diagram of an embodiment of a PV-to-PV architecture. The PV-to-PV architecture includes multiple substrings of PV cells designated $PV_1, \ldots, PV_5$, and DPP converters formed with inductors $L_1, \ldots, L_4$, and corresponding switches $q_{ij}$ that represent at least a portion of a power train thereof. A main current $I_{main}$ flows through the multiple substrings of PV cells $PV_1, \ldots, PV_5$ to a central power converter (designated "CPC"). In a PV-to-PV architecture, the DPP power converters need only carry a blocking voltage of two substrings of PV cells.

Figure 2:
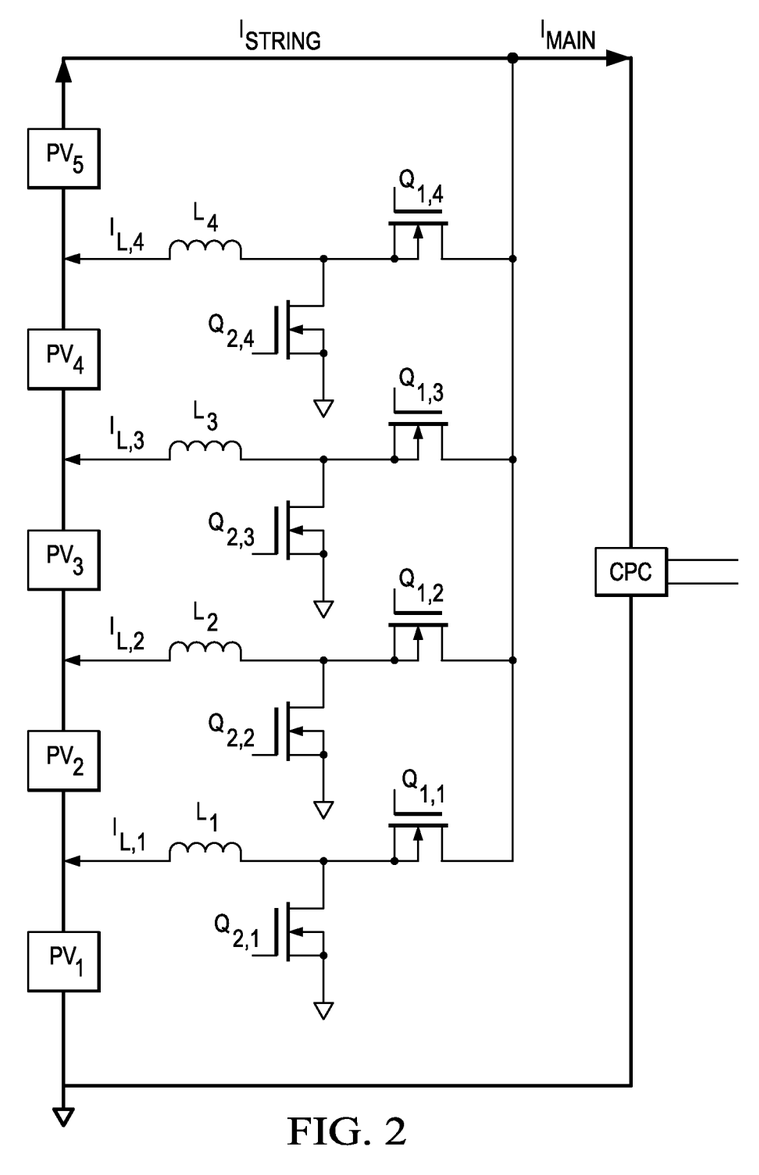
FIGS. 2 and 3 illustrated partial schematic diagrams of embodiments of PV-to-bus architectures.
Figure 3:
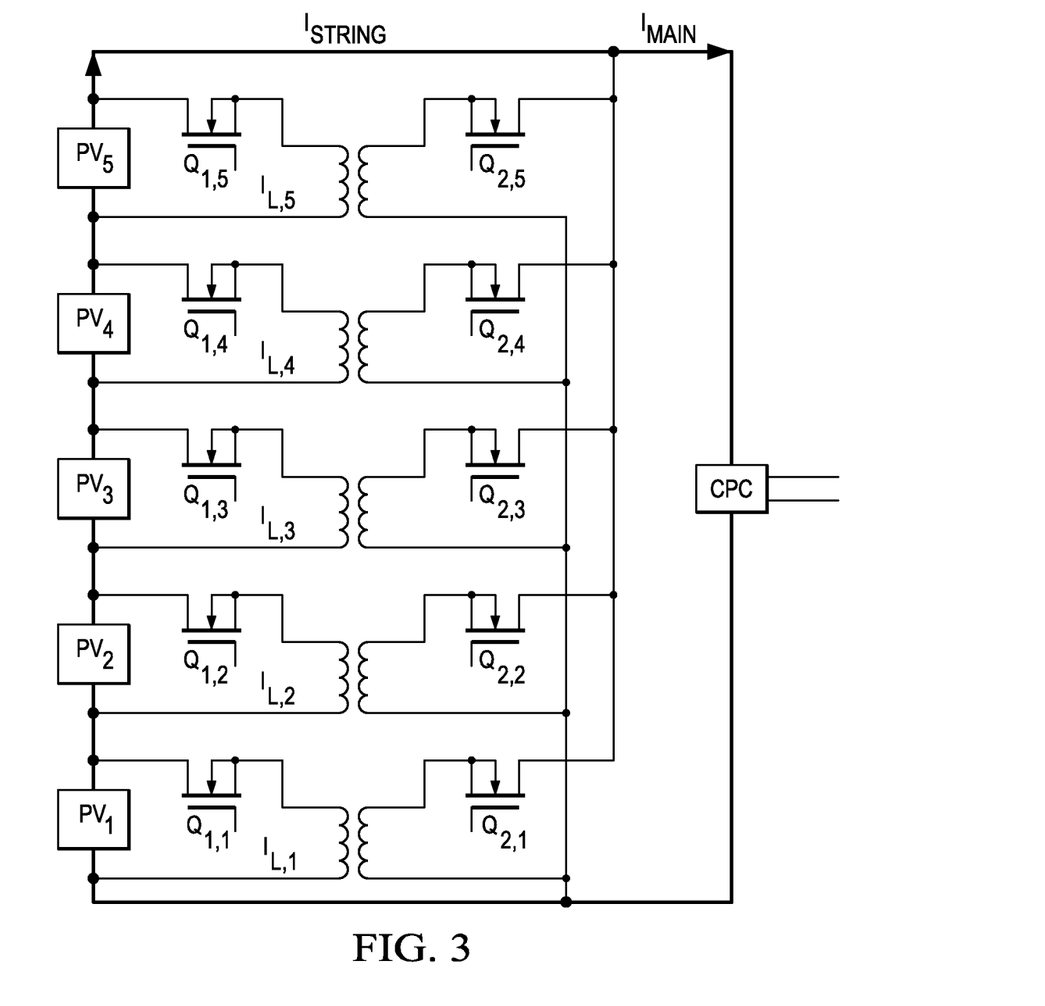

Turning now to FIGS. 2 and 3, illustrated are partial schematic diagrams of embodiments of PV-to-bus architectures. The PV-to-bus architectures include multiple substrings of PV cells designated $PV_1, \ldots, PV_5$. The DPP converters of FIG. 2 are formed with inductors $L_1, \ldots, L_4$, and corresponding switches $q_{ij}$ that represent at least a portion of a power train thereof. The DPP converters of FIG. 3 are formed with transformers and corresponding switches $q_{ij}$ that represent at least a portion of a power train thereof. A substring current $I_{string}$ flows through the multiple substrings of PV cells $PV_1, \ldots, PV_5$ and a main current $I_{main}$ flows through a central power converter (designated "CPC"). For PV-to-bus architectures, the DPP converters block the entire substring voltage, even though the magnetic devices may carry less than the full substring current $I_{string}$. While FIGS. 1 to 3 illustrate series arrangements of PV cells $PV_1, \ldots, PV_5$, the PV modules may also include parallel sources or combinations of series and parallel PV cells $PV_1, \ldots, PV_5$. The principals taught in this disclosure would be recognized to be extendible to these various combinations of series and parallel arrangements.

Ensuring MPPT across the DPP converters can be a challenging design task. As introduced herein, control of the DPP converters is implemented in a hierarchal control process for a plurality of power subsystems associated with a PV module and/or multiple substrings of PV cells of a PV module. A DPP converter (a power subsystem) can be implemented in, without limitation, the PV architectures described above. In this case, each PV element represents a substring of PV cells that would normally be bypassed with a diode. As such, the PV substrings collectively represent a single module. The central power converter can then be a microinverter ("MI"), and collectively the DPP converters and the microinverter can be integrated within the PV module to form an ACPV module (a photovoltaic module with an ac output) with DPP capability. In this case, the DPP converters can be controlled with a centralized controller (as part of the microinverter), which reduces design complexity for MPPT. Likewise, the DPP converters can be integrated with a dc-dc power optimizer rather than a microinverter with a similar effect.

Figure 4:
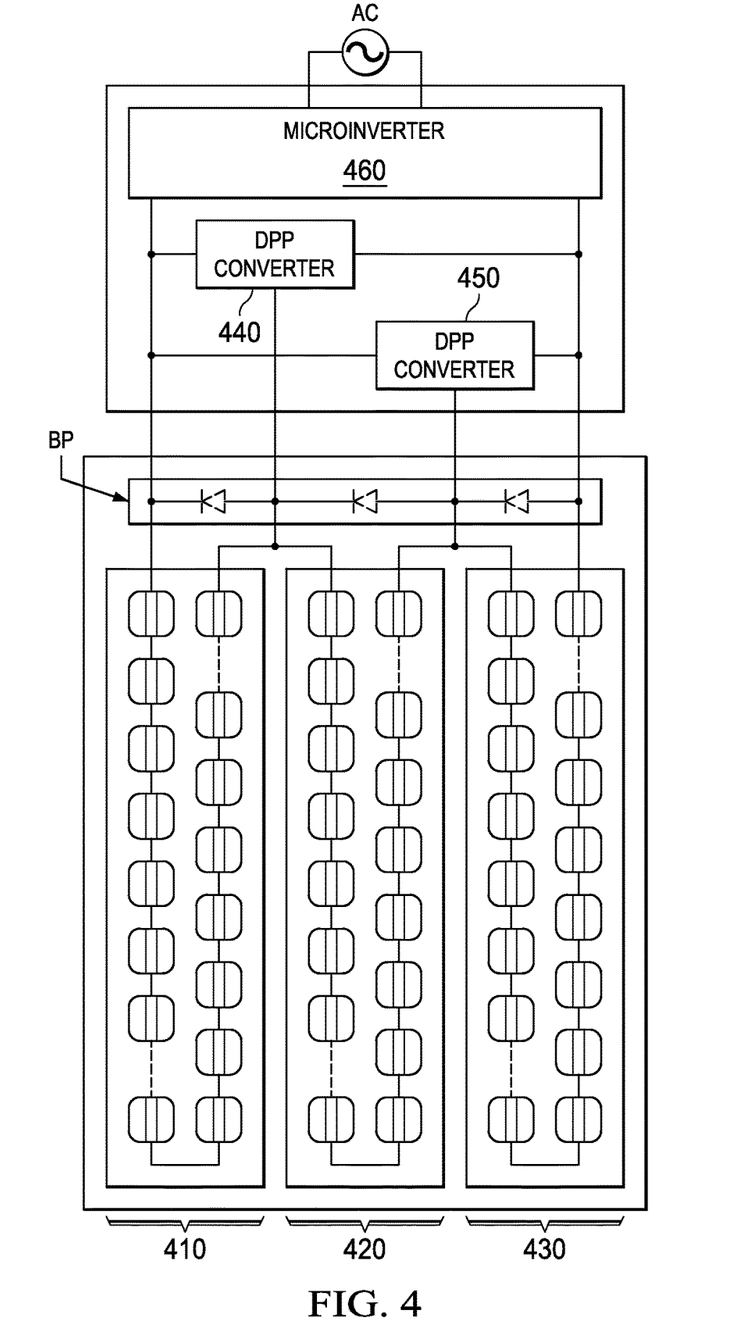
FIGS. 4 to 6 illustrate block diagrams of embodiments of PV systems.

Turning now to FIG. 4, illustrated is a block diagram of an embodiment of a PV system. The PV system includes a PV module formed with first, second and third substrings of PV cells 410, 420, 430. The PV system also includes a plurality of power subsystems having first and second DPP converters 440, 450 coupled to the first, second and third substrings of PV cells 410, 420, 430 via bypass diodes (generally designated BP). The PV system also includes a central power converter such as a microinverter 460.

A design complication arises for controlling a duty cycle of switches of the power trains of the DPP converters 440, 450. An MPPT control loop employs a measurement of current and voltage of each of the first, second and third substrings of PV cells 410, 420, 430 to properly adjust the duty cycle of each of the DPP converters 440, 450 for maximum power-point tracking. While it is less complex and with low cost to implement voltage sensors, it is desirable not to have a current sensor in each of the first, second and third substrings of PV cells 410, 420, 430. The current sensors insert series conduction losses and employ more expensive and space-consuming amplifier circuitry.

Figure 5:
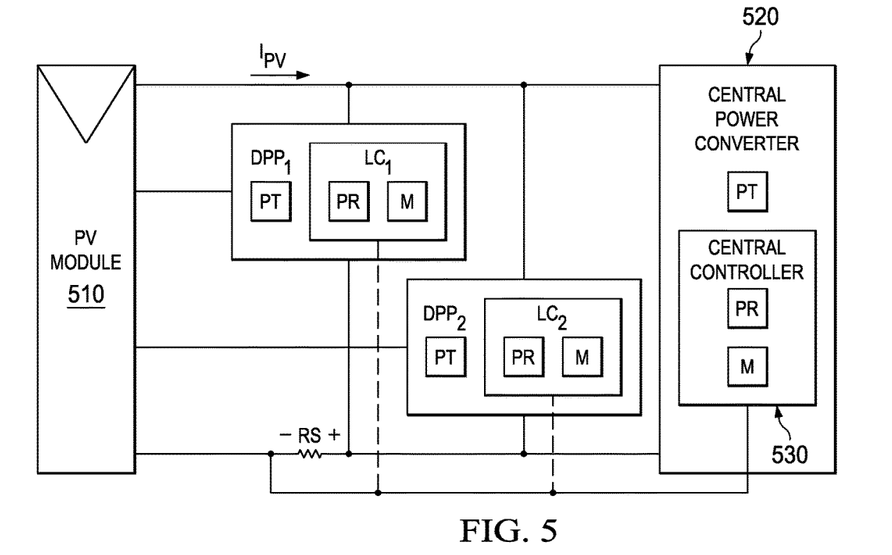

Turning now to FIG. 5, illustrated is a block diagram of an embodiment of a PV system. The PV system includes a PV module 510 formed with substrings of PV cells and provides a PV current $I_{PV}$. The PV module 510 is coupled to a plurality of power subsystems including first and second DPP converters $DPP_1$, $DPP_2$. The first and second DPP converters $DPP_1$, $DPP_2$ each include a power train (generally designated "PT") and first and second local controllers $LC_1$, $LC_2$, respectively. The first and second controllers $LC_1$, $LC_2$ each include a processor (generally designated "PR") and memory (generally designated "M"). The first and second DPP converters $DPP_1$, $DPP_2$ are coupled to a central power converter (e.g., microinverter) 520 that includes a power train (generally designated "PT") and a central controller 530. The central controller 530 includes a processor (generally designated "PR") and memory (generally designated "M"). In lieu of, or addition to, providing a current sensor in each substring of PV cells, the PV system can employ a current-sense resistor Rs for the central power converter 520, and infer MPPT information therefrom and from switching signals of the substrings of PV cells of the PV module 510 to control the duty cycle of the power train of the first and second DPP converters $DPP_1$, $DPP_2$. It should be understood that the first and second controllers $LC_1$, $LC_2$ and the central controller 530 may be implemented on different hardware or may share the same hardware. In other words, the first and second controllers $LC_1$, $LC_2$ and the central controller 530 may operate on different processors PR and share the same processor PR.

The processors introduced herein may be embodied as any type of processor capable of performing the functions described herein including, but not limited to, a microprocessor, digital signal processor, microcontroller, or the like. The processors may be embodied as a single core processor, or a multi-core processor having multiple processor cores. Additionally, the controllers introduced herein may include additional processors having one or more processor cores.

The memory introduced herein may be embodied as one or more memory devices or data storage locations including, for example, dynamic random access memory devices ("DRAM"), synchronous dynamic random access memory devices ("SDRAM"), double-data rate synchronous dynamic random access memory device ("DDR SDRAM"), flash memory devices, and/or other volatile memory devices. The memory is communicatively coupled to the processor via a number of signal paths, such as a data bus, point-to-point connections, or other interconnects. Although only a single memory is illustrated herein, the controllers may include additional memory.

Figure 6:
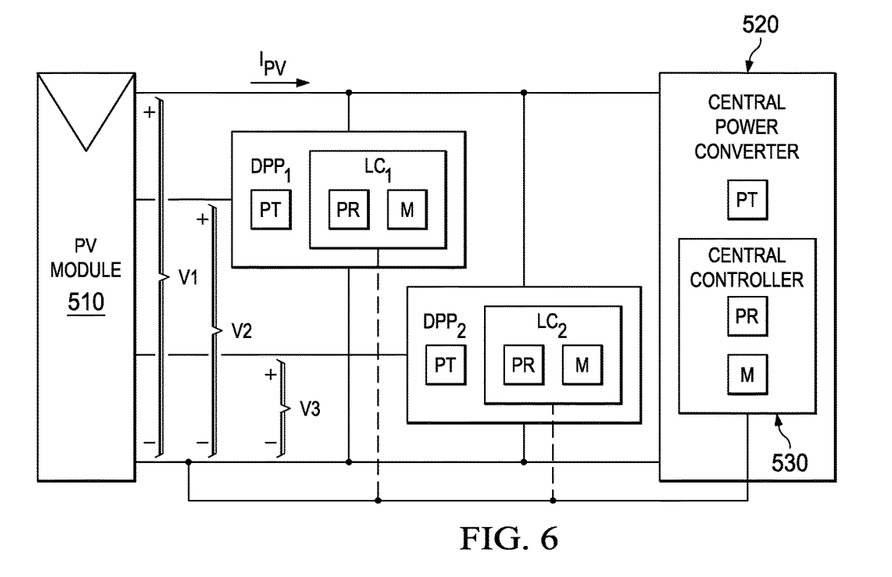

As evident from FIG. 6, a voltage v1, v2, v3 of each substring of PV cells of the PV module 510 may be sensed and provided to the central controller 530. Note that voltage sensing is a low cost and low loss process. One would typically only need to use resistive voltage dividers linked (possibly through a buffer) to the analog-to-digital converters ("ADCs") available in a central controller 530 in the central power converter 520.

Many power point tracking algorithms, including a "perturb and observe" algorithm and its variants, cause a power (sub)system to change (i.e., perturb) one of its signals (e.g., a dc voltage from a PV source) while locally observing a change its locally measured power. If the observed power increases, then a controller would continue to perturb the voltage in the same direction. Otherwise, it would negate/cancel the perturbation, or otherwise reverse the direction of the perturbation.

In the case of a DPP converter, each substring of PV cells potentially represents a PV source that may be monitored and tracked to produce increased or maximum power. As mentioned above, to equip each substring of PV cells with a current sensor to obtain a local accurate power measurement would be cumbersome. It is, however, only necessary to measure a change in power to implement an MPPT algorithm.

One way to accomplish this is to have each local controller of the DPP converter synchronized with the central controller of the central power converter. The action of each DPP converter is timed so that its effect on the overall power produced can be isolated. Each DPP converter would have a duty cycle, for example, that can be adjusted. The central power converter would also have a duty cycle that can be adjusted.

Adjustments of duty cycles can take place periodically, such as once every 16.67 milliseconds (one cycle of a 60 hertz power grid waveform). At the beginning of this period, one of an operating characteristic such as the duty cycle signals (or other suitable signal, such as a voltage command) is perturbed by the central controller and the observed power is recorded. The direction of perturbation (up or down) and the change in power from the previous measurement (also up or down) are used to determine which DPP converter is perturbed next and in which direction. Thus, the central controller repeatedly perturbs an operating characteristic at a rate sufficiently high that variations in power produced by the substrings of PV cells can be reasonably ignored. Substring shadowing produced by clouds and overlying trees generally changes at a relatively low rate, and can be ignored if the perturbations in the operating characteristic are performed at a rate sufficiently high.

Figure 7:
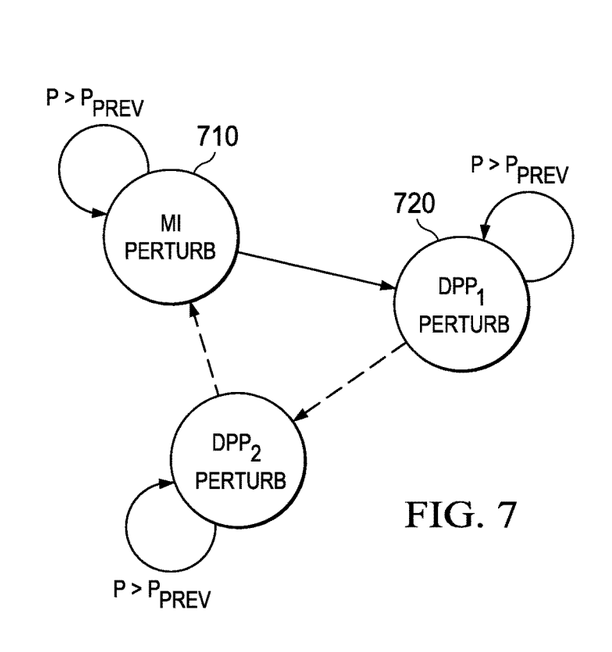
FIG. 7 illustrates a state diagram of an embodiment of a method of operating a PV system.

Turning now to FIG. 7, illustrated is a state diagram of an embodiment of a method of operating a PV system. The PV system includes a plurality of power subsystems including first and second DPP converters $DPP_1$, $DPP_2$ with first and second local controllers $LC_1$, $LC_2$, respectively. The first and second DPP converters $DPP_1$, $DPP_2$ are coupled to a central power converter (e.g., microinverter "MI") that includes a control controller. Supposing the system starts in a MI perturb state 710, the microinverter perturbs its duty cycle and observes the effect on an overall power P of the PV system. If the overall power P increases over its previous power level (P>Pprev) then the method returns to the MI perturb state 710 and repeats the same perturbation. If the overall power P decreases, then the method negates/reverses the microinverter perturbation and the method then transitions to a $DPP_1$ perturb state 720. In other words, if the overall power P decreases (P<Pprev), then the microinverter perturb direction transitions to a negative microinverter perturb direction.

Now, the duty cycle of the first DPP converter $DPP_1$ is perturbed in the $DPP_1$ perturb state 720 and the effect on overall power P is determined. If the overall power P increases over its previous power level (P>Pprev) then the method returns to the $DPP_1$ perturb state 720 and repeats the same perturbation. If the overall power P decreases, then the method negates/reverses the first DPP converter $DPP_1$ perturbation and the method then transitions to a $DPP_2$ perturb state 730. In other words, if the overall power P decreases (P<Pprev), then the $DPP_1$ perturb state direction transitions to a negative $DPP_1$ perturb state direction.

Now, the duty cycle of the second DPP converter $DPP_2$ is perturbed in the $DPP_2$ perturb state 730 and the effect on overall power P is determined. If the overall power P increases over its previous power level (P>Pprev) then the method returns to the $DPP_2$ perturb state 730 and repeats the same perturbation. If the overall power P decreases, then the method negates/reverses the second DPP converter $DPP_2$ perturbation and the method eventually transitions back to the MI perturb state 710. In other words, if the overall power P decreases (P<Pprev), then the $DPP_2$ perturb state direction transitions to a negative $DPP_2$ perturb state direction. While the method was described with respect to one central power converter and two power subsystems, the method can scale to accommodate any number of power subsystems and central power converters. Also, it is possible the ones of the power subsystems are inactive (e.g., for environmental reasons, or safety or reliability issues) and, under such circumstances, the respective local controllers are simply passed over when performing the methods as described herein.

This example was cast in terms of power subsystem duty cycle, but oftentimes the voltage produced by each DPP converter is the intended perturbation variable. The process is substantially the same either way. In the case of a voltage perturbation, a new voltage command for that DPP converter is determined and fed into a control loop (such as proportional-integral ("PI") loop) that adjusts DPP converter duty cycle to obtain a desired voltage. In either case, ultimately, duty cycle is adjusted. A voltage control is desirable since the duty cycle may continuously vary throughout the MPPT period to cancel ripple that may be due to a single-phase microinverter, for example. In that case, the duty cycle "perturbation" may be thought of as a change in the average duty cycle for a MPPT period. Of course, it is equally possible to perturb other variables such as the current.

Note that in this example it is only necessary to observe total power P, which may rely on one current sensor and one voltage sensor. In addition, for improved maximum power point tracking effect of DPP converters, the PV system can also advantageously utilize the measured signals (v1, v2, and v3) by reporting them out via a communications channel of the central power converter (via, for example, via a power line carrier). Likewise, duty cycle commands and related variables can also be reported. By analyzing the data, the PV system can estimate whether a PV module or a substring of PV cells is damaged, shaded in a particular way, or otherwise performing less than ideally. This analysis could be done on a case-by-case basis or automatically by a gateway device or by database software. Upon detecting abnormalities, such an automated system can log events for customer service, reliability, and performance analysis for review. Furthermore, the communications may be reversed so that the commands for duty cycles or desired substring voltages could be sent to a central controller and ultimately to the local controllers. Such a situation may be useful for diagnostic or other purposes.

Figure 8:
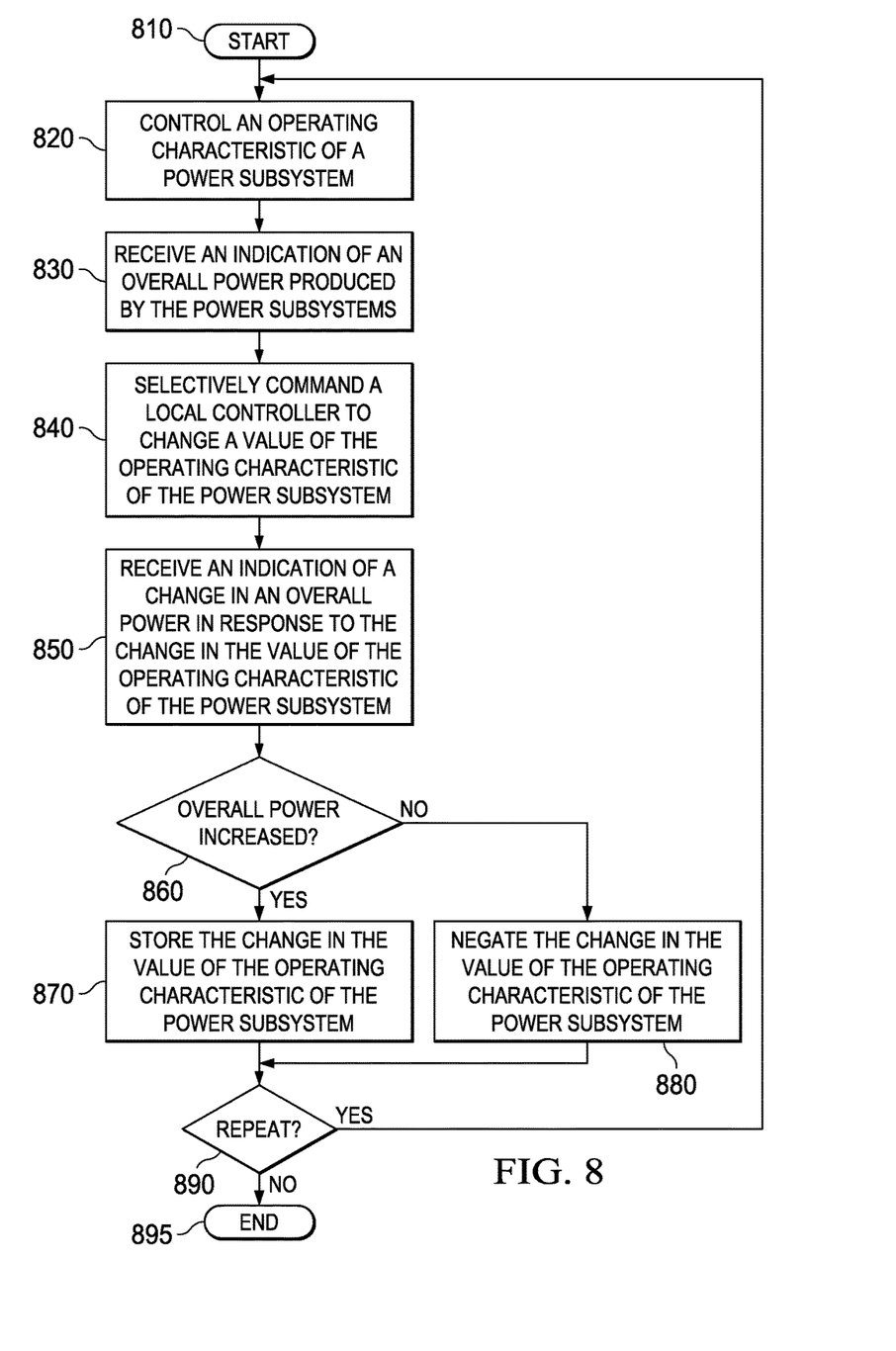
FIG. 8 illustrates a flow diagram of an embodiment of a method of operating a PV system.

Turning now to FIG. 8, illustrated is a flow diagram of an embodiment of a method of operating a PV system. While the method will be described with respect to a single central power converter (and central controller) and two power subsystems (and local controllers), the method can scale to accommodate any number of power subsystems and central power converters. The method may be performed at a frequency of an alternating current power produced by the power subsystems. The method begins at a start step or module 810. At a step or module 820, a local controller controls an operating characteristic (e.g., a duty cycle of a power train or an output voltage) of a power subsystem. The central controller then receives an indication of an overall power produced by the power subsystems at a step or module 830. In accordance therewith, the central controller may sense the overall power produced by the power subsystems. At a step or module 840, the central controller selectively commands the local controller to change a value of the operating characteristic of the power subsystem.

The central controller then receives an indication of a change in an overall power in response to the change in the value of the operating characteristic of the power subsystem at a step or module 850. In a decisional step or module 860, it is determined if the overall power has changed (e.g., increased). If the overall power has increased, the change in the value of the operating characteristic of the power subsystem is stored (in memory) in a step or module 870 and the method continues to a decisional step or module 890. If the overall power has not increased (i.e., decreased), the change in the value of the operating characteristic of the power subsystem is negated in a step or module 880 and the method continues to the decisional step or module 890. If the method should be repeated, then the method returns to the start step or module 810, otherwise the method concludes at an end step or module 895.

Thus, an apparatus operable with a plurality of power subsystems (e.g., differential power processing converters forming a portion of a photovoltaic power source) and methods of operation thereof with readily attainable and quantifiable advantages has been introduced. The plurality of power subsystems may form at least a portion of a photovoltaic-to-bus power architecture. In an embodiment, the apparatus includes a plurality of local controllers configured to control an operating characteristic (e.g., a duty cycle of a power train and/or an output voltage) of at least one of the plurality of power subsystems. The apparatus also includes a central controller configured to receive an indication of an overall power produced by the plurality of power subsystems, selectively command a first local controller of the plurality of local controllers to change a value of the operating characteristic of a first power subsystem of the plurality of power subsystems, receive an indication of a change in the overall power in response to the change in the value of the operating characteristic of the first power subsystem, and store, in memory, the change in the value of the operating characteristic of the first power subsystem if the overall power is increased. Conversely, the central controller is further configured to negate or otherwise cancel the change in the value of the operating characteristic of the first power subsystem if the overall power is decreased. In accordance with receiving an indication of a change in the overall power mentioned above, the central controller may sense the overall power produced by the plurality of power subsystems via a current-sense resistor.

The central controller may repeat the above-referenced functions with respect to any number of the plurality of power subsystems to further augment of the efficiency of the apparatus such as a PV system and can perform the functions at a frequency of an alternating current power produced by the plurality of power subsystems. The central controller is also configured in a search process to iteratively change the value of the operating characteristic to increase the overall power produced by the PV system or its power conversion efficiency.

Those skilled in the art should understand that the previously described embodiments of a controller for a power system/subsystem and related methods of operating the same are submitted for illustrative purposes only. In addition, other embodiments capable of producing controllers employable with other power conversion arrangements are well within the broad scope of the present disclosure. While the apparatus formed with a central controller operable with a plurality of power subsystems has been described in the environment of a PV system, the apparatus formed with a plurality of local controllers configured to control an operating characteristic of at least one of the plurality of power subsystems may also be applied to other power systems such as, without limitation, a power amplifier or a motor controller.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus operable with a plurality of power subsystems coupled to a central power converter, comprising:
   a plurality of local controllers with a corresponding one of said plurality of local controllers configured to control an operating characteristic of at least one of said plurality of power subsystems; and
   a central controller of said central power converter configured to:
   receive a measurement of an overall power produced by said plurality of power subsystems and provided to said central power converter;
   selectively command a first local controller of said plurality of local controllers to change a value of said operating characteristic of a first power subsystem of said plurality of power subsystems, wherein the first local controller is synchronized with the central controller at an adjustable duty cycle to isolate an effect that the change in the value of the operating characteristic has on the overall power;
   receive a measurement of a change in said overall power in response to said change in said value of said operating characteristic of said first power subsystem; and
   store, in memory, said change in said value of said operating characteristic of said first power subsystem if said overall power is increased.

2. The apparatus as recited in claim 1 wherein said central controller is further configured to negate said change in said value of said operating characteristic of said first power subsystem if said overall power is decreased.

3. The apparatus as recited in claim 1 wherein said first power subsystem comprises a differential power processing converter.

4. The apparatus as recited in claim 1 wherein said plurality of power subsystems form at least a portion of a photovoltaic-to-bus power architecture.

5. The apparatus as recited in claim 1 wherein said operating characteristic is a duty cycle of a power train of said plurality of power subsystems.

6. The apparatus as recited in claim 1 wherein said operating characteristic is an output voltage of said plurality of power subsystems.

7. The apparatus as recited in claim 1 wherein said central controller employs a current-sense resistor to sense said overall power produced by said plurality of power subsystems.

8. The apparatus as recited in claim 1 wherein said plurality of power subsystems provide at least a portion of a photovoltaic power source.

9. The apparatus as recited in claim 1 wherein said central controller is further configured to:
   selectively command a second local controller of said plurality of local controllers to change said value of said operating characteristic of a second power subsystem of said plurality of power subsystems;
   receive a measurement of a change in said overall power in response to said change of said value of said operating characteristic of said second power subsystem; and
   store, in said memory, said change of said value of said operating characteristic of said second power subsystem if said overall power is increased.

10. The apparatus as recited in claim 1 wherein said central controller is configured to:
    receive said measurement of said overall power,
    selectively command said first local controller,
    receive said measurement of said change in said overall power, and
    store said change of said value of said operating characteristic of said first power subsystem at a frequency of an alternating current power produced by said plurality of power subsystems.

11. A method operating an apparatus with a plurality of power subsystems coupled to a central power converter, comprising:
    controlling an operating characteristic of at least one of said plurality of power subsystems with a corresponding one of a plurality of local controllers; and
    receiving, at a central controller of said central power converter, a measurement of an overall power produced by said plurality of power subsystems and provided to said central power converter;
    selectively commanding, by said central controller, a first local controller of said plurality of local controllers to change a value of said operating characteristic of a first power subsystem of said plurality of power subsystems, wherein the first local controller is synchronized with the central controller at an adjustable duty cycle to isolate an effect that the change in the value of the operating characteristic has on the overall power;

receiving, at said central controller, a measurement of a change in said overall power in response to said change in said value of said operating characteristic of said first power subsystem; and storing, in memory, said change in said value of said operating characteristic of said first power subsystem if said overall power is increased.

12. The method as recited in claim 11 further comprising negating said change in said value of said operating characteristic of said first power subsystem if said overall power is decreased.

13. The method as recited in claim 11 wherein said first power subsystem provides differential power processing.

14. The method as recited in claim 11 further comprising providing a photovoltaic-to-bus power architecture with said plurality of power subsystems.

15. The method as recited in claim 11 wherein said controlling said operating characteristic comprises controlling a duty cycle of a power train of at least one of said plurality of power subsystems.

16. The method as recited in claim 11 wherein said controlling said operating characteristic comprises controlling an output voltage of at least one of said plurality of power subsystems.

17. The method as recited in claim 11 further comprising sensing, by a current sense resistor coupled to said central controller, said overall power produced by said plurality of power subsystems.

18. The method as recited in claim 11 wherein said plurality of power subsystems provide at least a portion of a photovoltaic power source.

19. The method as recited in claim 11 further comprising:

selectively commanding, by said central controller, a second local controller of said plurality of local controllers to change said value of said operating characteristic of a second power subsystem of said plurality of power subsystems;

receiving, at said central controller, a measurement of a change in said overall power in response to said change of said value of said operating characteristic of said second power subsystem; and storing, in said memory, said change of said value of said operating characteristic of said second power subsystem if said overall power is increased.

20. The method as recited in claim 11 wherein said receiving said measurement of said overall power, selectively commanding said first local controller, receiving said measurement of said change in said overall power, and storing said change of said value of said operating characteristic of said first power subsystem is performed at a frequency of an alternating current power produced by said plurality of power subsystems.

* * * * *